(12) United States Patent
Pardikes

(10) Patent No.: US 7,630,014 B2
(45) Date of Patent: Dec. 8, 2009

(54) LIGHTING APPARATUS FOR ATTACHMENT TO A CAMERA'S TRIPOD MOUNT AND METHOD OF USE

(76) Inventor: Brett James Pardikes, 4976 W. 61$^{st}$ Pl., Arvada, CO (US) 80003

( * ) Notice: Subject to any disclaimer, the term of this patent is extended or adjusted under 35 U.S.C. 154(b) by 645 days.

(21) Appl. No.: 10/835,901

(22) Filed: Apr. 30, 2004

(65) Prior Publication Data

US 2005/0243198 A1    Nov. 3, 2005

(51) Int. Cl.
*H04N 5/222* (2006.01)
*H04N 5/225* (2006.01)

(52) U.S. Cl. .................. 348/371; 348/370; 348/375

(58) Field of Classification Search ............ 348/370, 348/371, 373; 250/504; 362/16, 183, 195
See application file for complete search history.

(56) References Cited

U.S. PATENT DOCUMENTS

| | | | |
|---|---|---|---|
| 4,012,749 A | 3/1977 | Numata | |
| 4,866,285 A | 9/1989 | Simms | |
| 5,213,404 A | 5/1993 | Chen | |
| 5,594,254 A * | 1/1997 | Palmer | 250/504 R |
| 5,752,097 A * | 5/1998 | McIntyre | 396/157 |
| 6,263,161 B1 * | 7/2001 | Washisu | 396/50 |
| 6,488,390 B1 * | 12/2002 | Lebens et al. | 362/231 |
| 6,511,202 B1 * | 1/2003 | Henry | 362/195 |
| 6,942,357 B2 * | 9/2005 | Parsons et al. | 362/183 |
| 6,957,905 B1 * | 10/2005 | Pritchard et al. | 362/554 |
| 7,052,151 B2 * | 5/2006 | Terada et al. | 362/16 |
| 2003/0095406 A1 * | 5/2003 | Lebens et al. | 362/231 |
| 2003/0160889 A1 | 8/2003 | Angeli | |
| 2003/0161135 A1 * | 8/2003 | Hernandez | 362/12 |
| 2003/0180037 A1 | 9/2003 | Sommers | |
| 2004/0080668 A1 * | 4/2004 | Inoue | 348/376 |
| 2005/0122424 A1 * | 6/2005 | Overstreet | 348/373 |
| 2005/0128747 A1 * | 6/2005 | Tsay | 362/253 |

* cited by examiner

*Primary Examiner*—Sinh Tran
*Assistant Examiner*—Christopher K Peterson
(74) *Attorney, Agent, or Firm*—Leyendecker & Lemire, LLC; Kurt Leyendecker

(57) ABSTRACT

A lighting apparatus for use with a camera is described. In at least one embodiment, the apparatus comprises one or more light emitting diodes and one or more small batteries contained in a housing. A cylindrical piece extends from one side of the housing and is adapted to removeably secure the apparatus in a tripod mount on the camera. The apparatus is lightweight and compact and provides continuous illumination to a scene (opposed to the momentary illumination of a camera flash) to facilitate the recording of video.

9 Claims, 10 Drawing Sheets ies can provide as much, if not more, light than a traditional incandescent-based flashlight using D, C or A sized batteries, and even have a runtime in excess of the incandescent-based flashlight.

LIGHTING APPARATUS FOR ATTACHMENT TO A CAMERA'S TRIPOD MOUNT AND METHOD OF USE

FIELD OF THE INVENTION

This invention generally relates to photographic lighting systems. More particularly, this invention pertains to a lighting apparatus attachable to tripod mount of a still or video camera.

BACKGROUND

Strobe-type flashes using a gas-filled discharge tube are well known for use on still cameras for lighting a scene simultaneously with the taking of a still picture. Strobe-type flashes provide a significant amount of light for a fraction of a second that is sufficient to expose either film or imaging sensor contained in the associated still camera. Most point-and-shoot type cameras and some single lens reflex-type (SLR) still cameras have a strobe-type flash integrated with the camera. Further, most SLR cameras and some advanced digital models include a hot shoe to which an external flash module can be attached. The contacts on the hot shoe coordinate the activation of the flash with the shutter of the associated camera. Typical consumer grade point and shoot cameras both digital and film do not typically include a separate hot shoe.

Digital cameras have become very popular in the past few years. Digital cameras replace film with a permanent photo-sensitive sensor that captures a scene, which is then transferred in digital form to memory. An added benefit of digital cameras is that they are typically capable of recording video sequences in additional to still pictures. Early digital cameras were only capable of recording very low resolution video clips at low frame rates resulting in a video that was jerky and had only enough resolution to be properly viewed in a small window on a user's computer. With the advent of higher resolution sensors and faster electronics, many newer digital cameras are capable of recording video at frame rates and resolutions that make the videos suitable for playback on larger screens and even on televisions. The more advanced digital cameras even support frame rates and video resolutions rivaling analog and some digital video recorders.

The video capability is generally viewed as an add-on feature of digital still cameras rather than a primary feature. Digital still cameras are not optimized in design or features to fully realize the potential of their video recording capabilities. For instance, no continuous illumination source is provided to light a scene of which a video is being taken. Obviously, strobe-type flashes are useless for taking video given their extremely short duration. To cope with recording video in low light situations, the controller within a typical digital camera increases the gain of the sensor; however, as the gain increases, the sensor's level of electronic noise increases substantially thereby degrading the quality of the resulting video. Accordingly, the video capabilities of a typical digital still camera are not useful particularly useful in low light situations.

Within the last decade or so, extremely bright light emitting diodes (LEDs) have been developed. LEDs, which are extremely energy efficient, require only a fraction of the energy input as other sources of illumination, such as incandescent and fluorescent lights. Accordingly, for a similar amount of light output, battery-powered LED based illuminators can be made much smaller and much lighter than battery-powered illuminators using other light sources. For example, a LED-based flashlight running on button cell batteries can provide as much, if not more, light than a traditional incandescent-based flashlight using D, C or A sized batteries, and even have a runtime in excess of the incandescent-based flashlight.

Several prior art documents discuss the use of LED-based flashes in place of strobe-type units. One of the first mentions was in U.S. Pat. No. 4,866,285, wherein LEDs optimized to emit infrared light are incorporated into a hot shoe flash. This flash unit is taught to be utilized when a user is shooting infrared type film. In a traditional manner, the infrared LEDs flash in synchronization with the operation of the associated camera's shutter.

U.S. Patent Application #'s 2003/0160889 ('889) and 2003/0180037 ('037) both suggest the use of using one or more bright white light LEDs in place of a gas-filled discharge tube. In both, the LED's are contemplated for use in a traditional manner to provide a short duration pulse of light to illuminate a scene to facilitate the taking of a still picture, although the '889 reference does suggest providing a version of the camera incorporating a manually-activated switch to turn the LEDs on and off when the flash circuit is not coupled with the shutter trigger button. Both also contemplate having the flash incorporated into the camera, although the '037 reference also contemplates the flash being separately housed, but still electronically coupled to the camera to facilitate flash synchronization. Neither suggests the use of the continuous illumination of the LEDs for purposes of taking video using a digital still camera.

SUMMARY OF THE INVENTION

In one embodiment of the present invention a lighting apparatus for use with a camera is described. The lighting apparatus typically comprises (i) one or more light emitting diodes (LEDs), (ii) a power source electrically coupled to the one or more LEDs, (iii) a housing that has a first surface and at least partially encasing the one or more LEDs, and (iv) a stud extending from the first surface. The stud is operatively coupled with the housing and adapted to be removeably received in a tripod mount of the camera.

In another embodiment of the present invention a method of taking digital video using a digital still camera is described. A lighting apparatus is attached to the digital still camera. The lighting apparatus typically comprises one or more light emitting diodes (LEDs) and one or more batteries for powering the LEDs. The lighting apparatus is turned on to illuminate a scene generally in front of a lens of the camera. The digital still camera is put into a video capture mode, and digital video of the scene is recorded.

In yet another embodiment of the present invention another lighting apparatus for use with a camera is described. The lighting apparatus typically includes (i) a light source, (ii) one or more batteries, and (iii) a housing at least partially encasing the light source and the batteries. The housing typically has a first surface. A stud also extends from the first surface. The stud is operatively coupled with the housing and is adapted to be removeably received in a tripod mount of the camera.

In even another embodiment comprises a lighting apparatus for use with a wireless phone incorporating a digital camera is described. The lighting apparatus typically comprises one or more LED's and one or more batteries contained in a housing. The apparatus also includes a connector that is typically coupled to the housing and is adapted to attach to the wireless phone.

DETAILED DESCRIPTION

Figure 1:
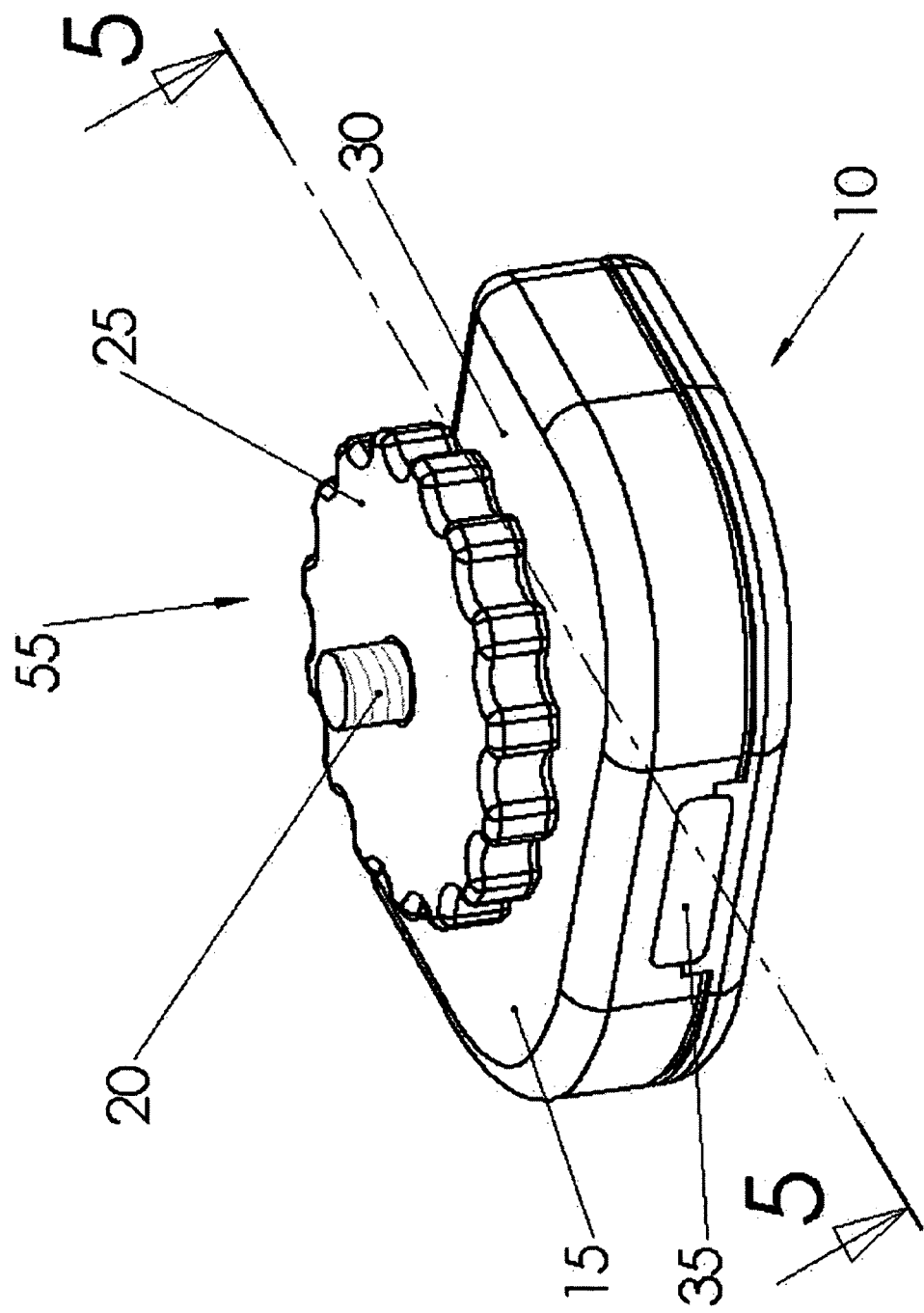
FIG. 1 is an isometric top view of a first preferred embodiment of the present invention.

Embodiments of the present invention comprise a compact and lightweight video lighting apparatus having LED illuminators and its own power supply that is attachable to a digital still camera or video camera for use in lighting a scene to facilitate video recording. In a typical embodiment, the apparatus is self contained and includes a protruding stud that is adapted to expansively or threadably couple to a tripod mount of a camera. Additionally, in variations of the typical embodiment, the lighting apparatus also includes a tripod mount on one side thereof wherein the coupled camera and lighting apparatus can be mounted to a tripod.

Most point and shoot digital cameras lack hot shoes or even cold shoe mounts to which an accessory lighting apparatus can be attached to the camera. In fact, most point and shoot digital cameras are not intended to be used with additional accessories and are intended to be fully self contained. However, most digital cameras including the most compact variations include a standard tripod mount through which the camera can be attached to a tripod device adapted to hold the camera. Accordingly, a typical embodiment of the lighting apparatus can be securely mounted to the bottom (typically) of the camera to provide ample continuous light for taking videos. Advantageously, the usefulness of the digital still camera is enhanced making it suitable for taking video in low light situations. Given the advances in digital camera technology in general and in the video recording capability of digital still cameras specifically, the use of a compact digital still camera along with an embodiment of the present invention will effectively replace the need for a separate dedicated video for all but the most discriminating consumers.

Users of digital cameras often prefer to use the display monitor on the back side of the camera in place of a viewfinder. In fact, several digital camera models have completely done away with the viewfinder altogether. Operationally, the scene shown in the view finder is an image sampled from a fraction of the individual photo sensors on the digital cameras imager. In low light, because of the low sensitivities of the imaging sensor and or the particular design of the display monitor, the image in the monitor can be very dark making it difficult for a user to accurately frame a scene of which he desires to take a still picture. Further, the darkness of the scene rendered on the monitor may prevent the user from seeing the expressions or the actions of people in the scene that he/she may be desirous of capturing. It is appreciated that the quality of the resulting photograph will probably be appropriately lit as the camera's built in flash will trigger when the shutter button is pressed and the resulting scene will be properly exposed. Advantageously, by using an embodiment of the present invention, additional light is provided to illuminate the scene resulting in a brighter monitor display and improving the photographer's ability to frame and judge the content of the scene using the display monitor.

In another embodiment of the present invention, the lighting apparatus is configured to releasably couple to a wireless camera phone. Accordingly, the light can be used to illuminate the scene to facilitate the taking of still pictures since the great majority of camera phone do not provide a built in flash or other illumination means. Alternatively, the light can be used to illuminate a scene for the capture of a video clip using the phone's camera.

Terminology

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases means that a particular feature, structure, or characteristic described in connection with the embodiment is included in at least an embodiment of the invention. The appearances of the phrase "in one embodiment" in various places in the specification are not necessarily all referring to the same embodiment.

The term "couple" or "coupled" as used in this specification and the appended claims refers to either an indirect or direct connection between the identified elements, components or objects. Often the manner of the coupling will be related specifically to the manner in which the two coupled elements interact. For example, two elements are electrically coupled if electrical current can travel from one element to another even if the elements are not directly connected to one another but rather by way of a wire or other electrically conductive trace. Further, two elements can be operatively coupled if they are in communication with each other.

Unless otherwise specifically indicated, the term "camera" or "digital camera" refers to both a still camera and a video camera unless specifically indicated otherwise in the surrounding text.

A First Preferred Embodiment

Figure 2:
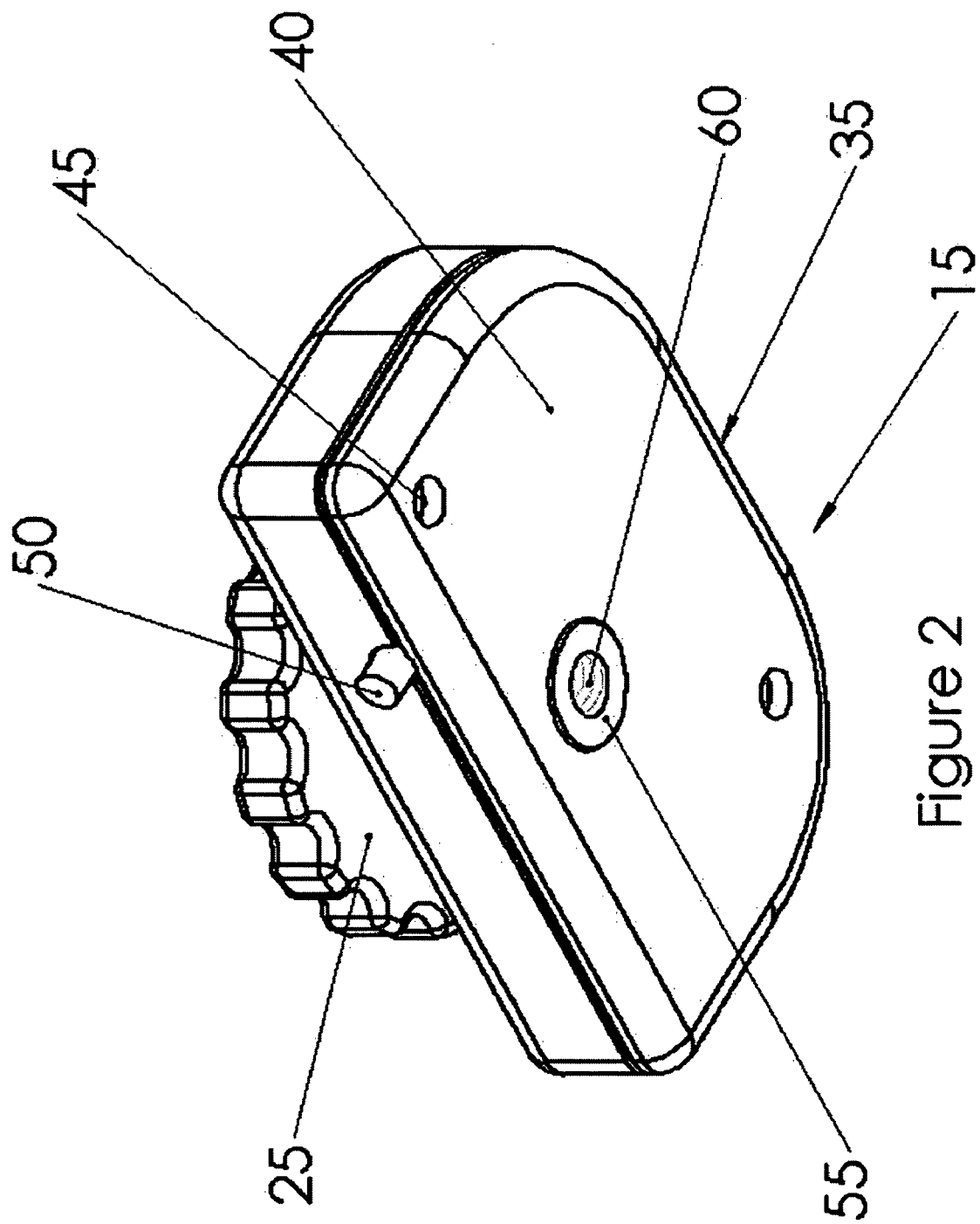
FIG. 2 is an isometric bottom view of the first preferred embodiment of the present invention.

A first preferred embodiment of the present invention is illustrated in FIGS. 1-6. As illustrated in FIGS. 1 and 2, the apparatus 10 comprises a housing 15 having a window 35 or lens on its front side through which light from one or more LEDs can pass. The housing is typically comprised of plastic, although other suitable materials, such as metals and composites, can be utilized in variations of the first preferred embodiment.

The window 35 is typically comprised of a translucent plastic or glass. In certain variations, the window can be substantially clear and in other variations the window can be frosted or otherwise configured to diffuse the light emanating therefrom. In other variations, the window can comprise a lens that that directs the beam of light at a desired coverage angle from the apparatus.

Also as best seen in FIG. 2, a switch 50 extends outwardly from the rear side of the housing. The switch is adapted to turn the LEDs off and on, as well as, select various brightness levels. In certain variations that incorporate infrared LEDs and white light (and/or other visible light spectrum) LEDs, the switch can also be utilized to illuminate the LEDs of one type in particular or all of the LEDs simultaneously.

A generally cylindrical piece 55 passes through the housing between the housing's top and bottom sides 30 & 40. A threaded stud portion 20 and a thumbwheel portion 25 of the cylindrical piece extend upwardly from the housing's top side. Further, the bottom end of the cylindrical piece extends through an opening provided on the bottom side of the housing and is generally flush with the outside surface of the bottom side. A threaded bore 60 that is axially aligned with the cylindrical piece and is generally perpendicular to the bottom side extends inwardly from the end of the cylindrical piece, and is adapted to receive a standard ¼-20 threaded stud from a tripod therein. The cylindrical piece is typically rotateably coupled with the housing 15. The cylindrical piece is typically unitarily molded from a polymeric material that can be reinforced with particulate or fibrous filler material. Alternatively, the cylindrical piece can be metallic and formed by casting or forging. In another variation, the cylindrical piece can comprise several separate elements that are mechanically, adhesively or otherwise joined together.

Figure 3:
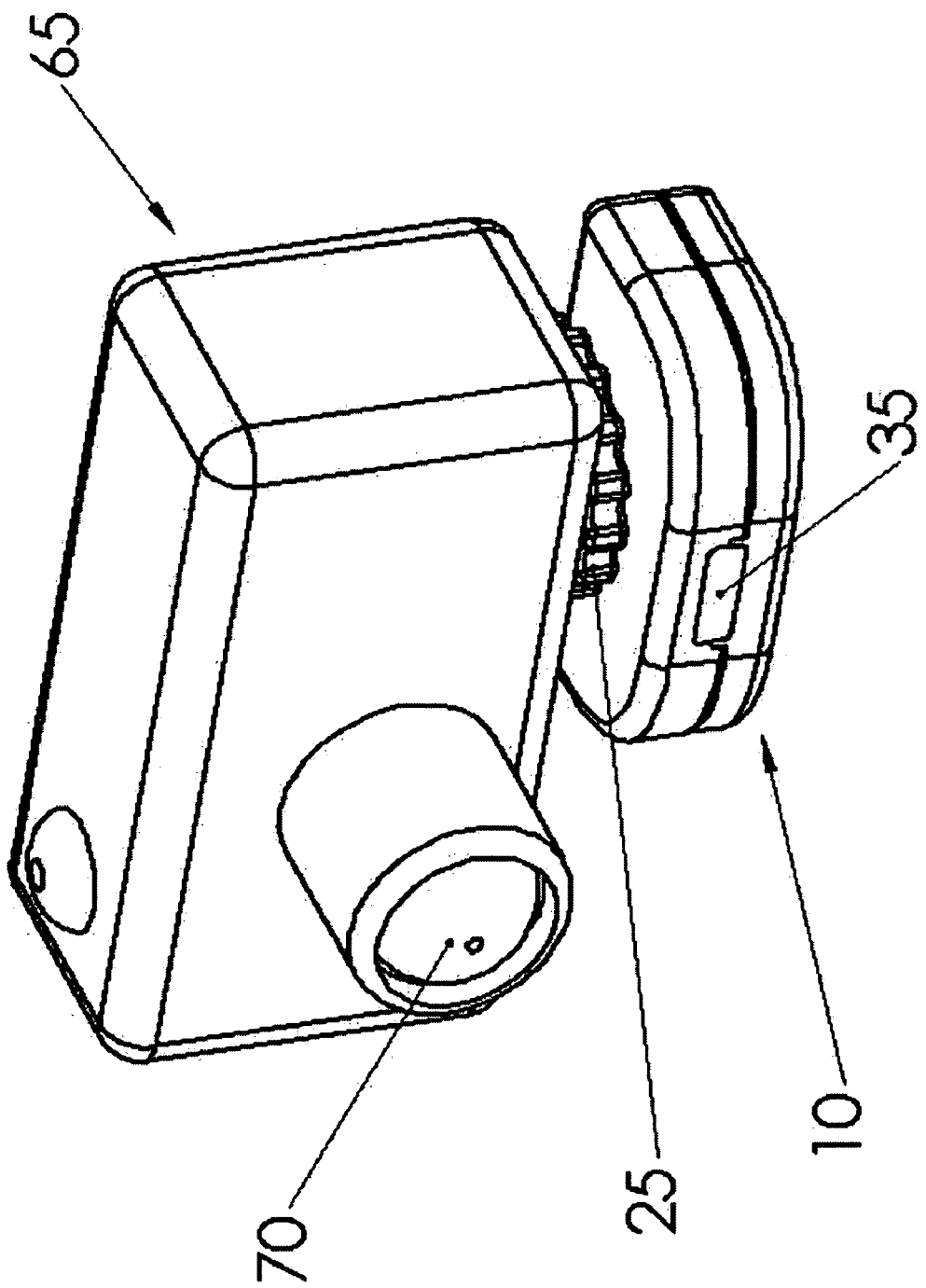
FIG. 3 is an isometric front view of the first preferred embodiment of the present invention illustrating the invention attached to a camera by way of the camera's tripod mount.

The threaded stud portion 20 of the cylindrical piece 55 extends upwardly from the thumbwheel 25 and is sized and configured to be threadably received in a standard tripod mount of an associated camera as illustrated in FIG. 3. The threaded stud typically has ¼-20 sized threads. The thumbwheel generally comprises a cylindrical disk having a larger diameter than the remainder of the cylindrical piece with a scalloped (or knurled) circumferential edge. The thumbwheel permits a user to easily rotate the cylindrical piece relative to the housing when securing the apparatus in the camera's tripod mount.

Referring to FIG. 3, the apparatus 10 is illustrated mounted to a digital still camera 65. The apparatus is orientated so that its window 35 generally points in the same direction as the camera's lens 70. Accordingly, when turned on, the lighting apparatus illuminates the scene directly in front of the camera and its lens thereby helping facilitate the capture of video images in low light situations.

Figure 4:
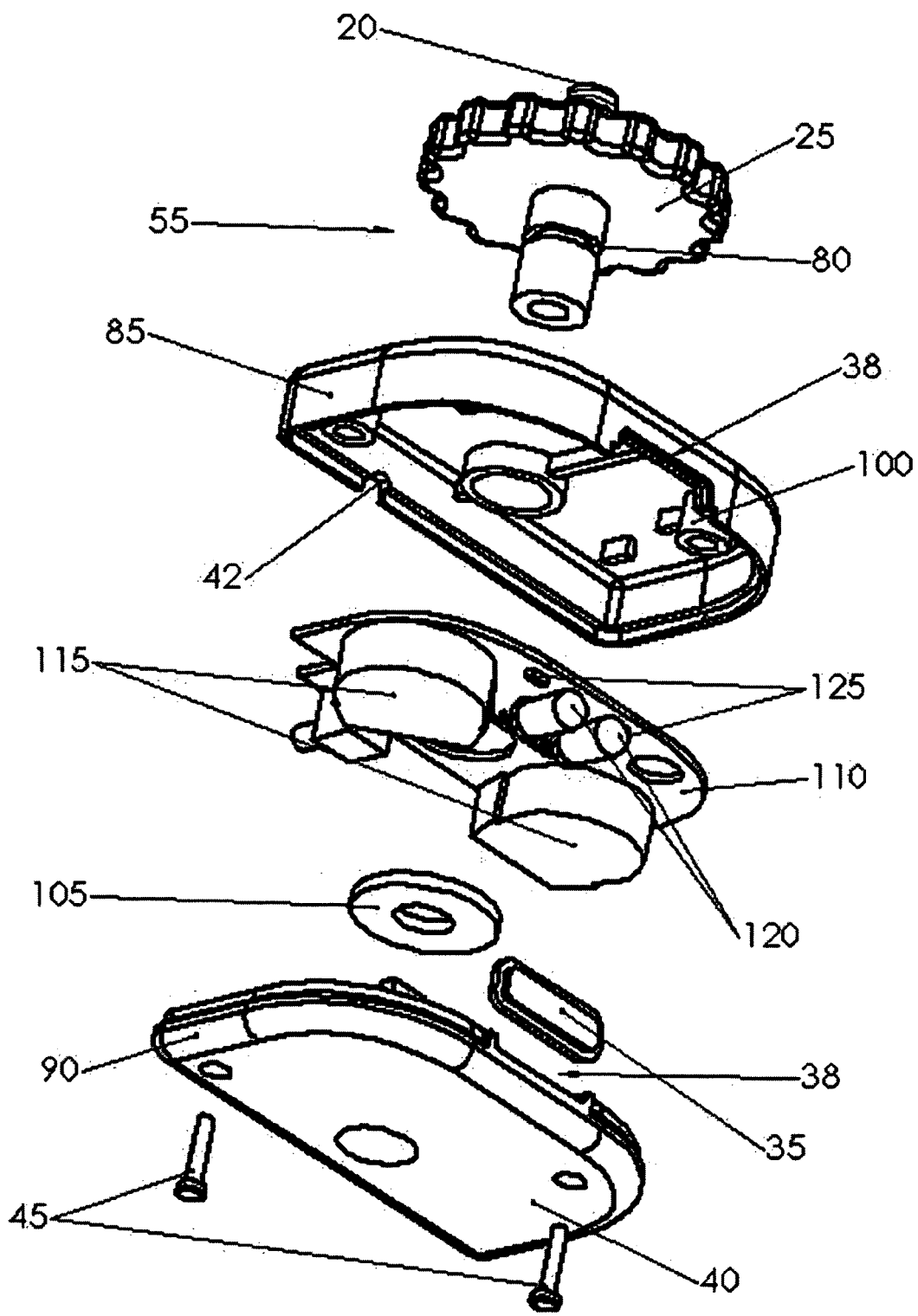
FIG. 4 is an exploded isometric view of the first preferred embodiment of the present invention.
Figure 5:
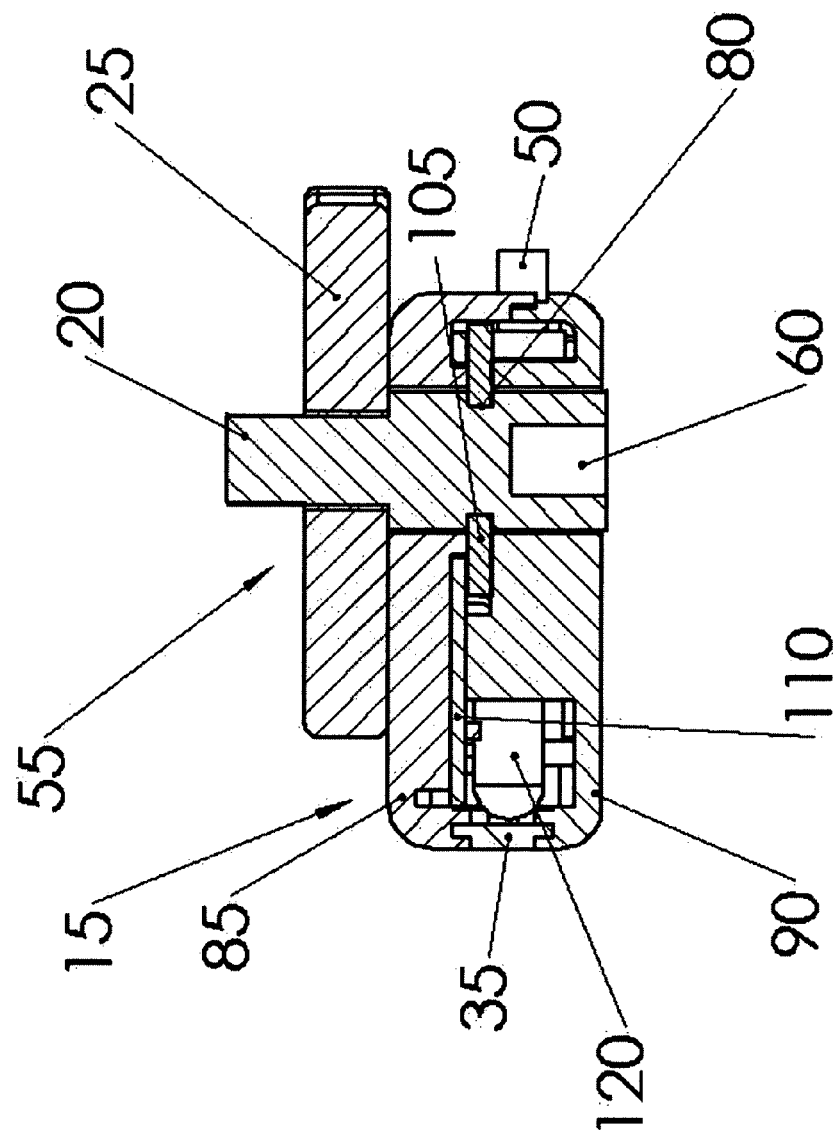
FIG. 5 is a cross sectional view of the first preferred embodiment of the present invention taken along line 5-5 of FIG. 1.

Referring to FIG. 4, an exploded view of the first preferred embodiment lighting apparatus is illustrated. Noticeably, the housing 15 comprises top and bottom sections 85 & 90 that fit together and are secured to each other with screws 45 or other types of fasteners. As shown, the screws pass through openings in the bottom side of the bottom section and bosses (not shown) that extend upwardly from the inside surface of the bottom side 40. The fasteners are threadably received into corresponding bosses 100 that extend downwardly from the inside surface of the top section's top side 30. At the intersecting edges of the top and bottom sections, corresponding slotted cut away regions 38 are provided in which the window 35 is received. Further, a cutaway portion 42 is provided on at least the top section at the intersecting edge through which a portion of the switch 50 can extend out of the housing. The top section also includes a tubular boss 44 that extends downwardly from the top side in which the cylindrical piece 55 is rotateably contained. A similar tubular boss (not shown) extends upwardly from the bottom side of the bottom section. It is appreciated that when the top and bottom sections are joined together, the respective ends of the tubular bosses do not meet as best shown in FIG. 5. Rather, there is a space therebetween to receive a rubber washer 105 that is described in greater detail below.

A motherboard 110 is contained within the housing 15. Typically, two button cell battery holders 115 are surface mounted to the board. Electronic componentry 125 is also attached to board and generally includes various capacitors, resistors and dedicated integrated circuits as necessary for the operation of the lighting apparatus 10. The integrated circuits can include a clock or timer circuit which operates to automatically turn off the LEDs after certain predetermined amount of time has passed. Preferably, the electronic componentry is also surface mounted to the motherboard. Two thru-hole mount LEDs 120 (surface mount LEDs can also be used) are attached to the motherboard along its front edge such that they are located directly behind the window 35 when the apparatus is assembled. Finally, the switch 50 is attached to the backside of the motherboard. Typically, because of the sheer forces involved with the operation of the switch, the switch is not surface mounted to the motherboard but rather is mounted to the motherboard using more traditional soldered pins that pass through holes made through the motherboard. The battery holders, the electronic componentry, the LEDs and the switch are all electrically connected by way of conductive traces on the motherboard. It is to be appreciated that the actual electronic componentry and configuration of the motherboard can vary substantially as would be obvious to someone of ordinary skill in the art.

Preferably, high brightness (HB) and ultra high brightness (UHB) LEDs 120 are used in the apparatus. For more traditional use, white light spectrum LEDs are used; however, in variations of the first preferred embodiment one or more or all of the LEDs can be the type that emits primarily in the infrared spectrum for use in capturing infrared videos or still pictures. Further in other variations, LEDs that emit light in other portions of the visible spectrum may be specified. For instance, LEDs that approximate the portion of the visible spectrum illuminated by incandescent light bulbs can be utilized in certain variations.

Typically, LEDs 120 include an epoxy portion that encapsulates the diode and additionally acts as a lens to direct the light emanating there from. The epoxy lens may be colored to further effect the spectrum of light emitted by particular LED. The angle at which the beam of light is transmitted from an LED depends on the particular design of the epoxy lens. For instance, LEDs with narrow angle lenses can be specified when a narrow beam of higher intensity light is desired, and LEDs with wide angle lenses can be specified when a wider beam of light having a lower average intensity is desired. Preferably, the angle of light transmission of the LEDs is matched to the corresponding field of view angle of a typical camera with which the apparatus will be used. Ideally, the LED light transmission angle is matched with the widest field of view angle of the camera's lens since many digital still cameras utilize zoom lenses with varying fields of view. Even though most digital still cameras have a 35 mm equivalent of focal lengths of 28 to 38 mm at their widest, LEDs having light transmission angles in excess of the fields of view for lenses of these focal lengths are not desired since visible light intensity is greatly reduced as a function of distance with wide angle LEDs. Rather, LEDs having a light transmission angles equal too or less than the field of view angle of the camera are preferred to maximize light intensity within the camera lens's field of view. In one variation of the first preferred embodiment, LEDs having light transmission angles of about 20 to 40° are utilized. It is to be appreciated that in other variations the LEDs with wider or narrower light transmission angles can be desirable depending on the particular use of the lighting apparatus and the particular specifications of an associated camera. In yet other variations, a lens can be used in place of the window wherein the lens is primarily responsible for the transmission angle of the light beam emanating from the lighting apparatus.

In the first preferred embodiment, the two button cell battery holders 115 are each adapted to hold two CR2032 button cell batteries. This combination of batteries used in conjunction with 2 white thru-hole LEDs 120 provides approximately 15 hours of continuous use. In variations of the first preferred embodiment, any number of different types of batteries can be utilized including AA and AAA cells and other size button cell batteries. Further, in other variations an AC adapter may be provided wherein the device can draw power from an AC outlet. Since the weight of the batteries is typically the most substantial contributor to the overall weight and volume of the apparatus, smaller and lighter cells are generally preferred. Further, more compact cells are preferred as they facilitate making the apparatus smaller in volume as well. Ultimately, a lighting apparatus having a total weight of less than about 2.5 ounces is preferred, less than about 2 ounces is more preferred and less than 1.5 ounces is most preferred. Concerning the apparatus's size, a volume of less than 1.75 cubic inches is preferred, less than 1.50 cubic inches is more preferred and less than 1.25 cubic inches is most preferred. It is appreciated that the use of small lightweight batteries would not be possible but for the very high energy efficiency of the LEDs, although other types of high efficiency illumination sources can be utilized in place of the LEDs in other variations of the first preferred embodiment.

Figure 6:
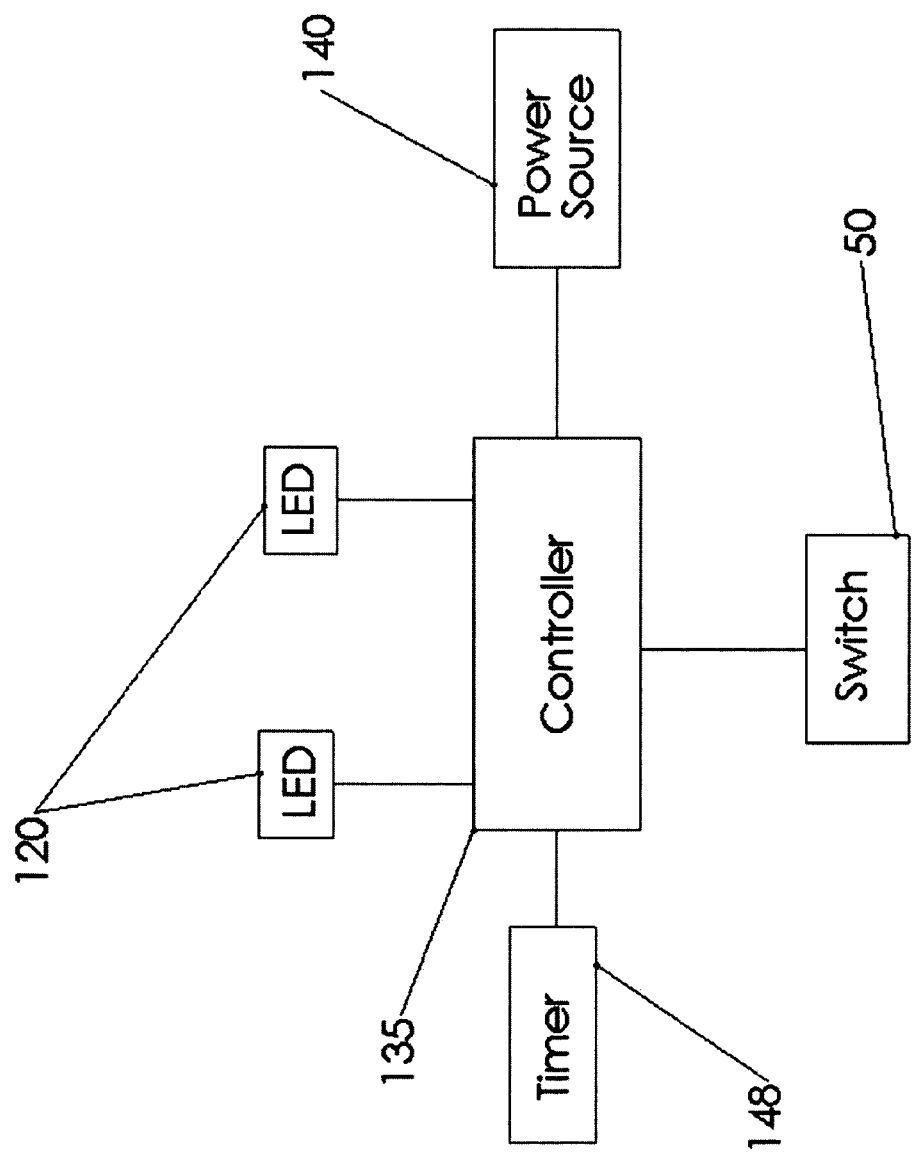
FIG. 6 is a block diagram illustrating the configuration of the electronic componentry of one variation of the first preferred embodiment.

As illustrated in FIG. 6, the electronic componentry of the first preferred embodiment can include a controller 135 and/or a timing circuit in certain preferred variations. For instance, in one variation the controller circuit in conjunction with an associated timer circuit 148 is adapted to interrupt the supply of current to the LEDs 120 after a certain period of time has passed, such as 15 minutes. Additionally, the controller can be utilized to vary the brightness of the light beam emanating from the apparatus by controlling the voltage supplied to the LEDs from the power source 140, as well as, selectively illuminating less than all the LEDs provided. Accordingly, by depressing the switch 50 multiple times the user can adjust the brightness level of the lighting apparatus. In other embodiments, some of the LEDs may put out light from a different spectrum than the other LEDs, such as where one or more of the LEDs provide visible white light and one or more of the remaining LEDs provide infrared illumination. Ultimately, the controller can be utilized to selectively illuminate the LEDs based on input provided at the switch. In other variations of the first preferred embodiment, no advanced control or timing circuitry is used wherein moving the switch between two or more positions determines the direct flow of current from the power source to the LEDs.

As mentioned above and illustrated in FIGS. 4 and 5, a semi-rigid rubber washer 105 is provided to hold the cylindrical piece 55 and the motherboard 110 in place within the housing 15. Simply, the washer is slid over the cylindrical piece until it snaps into place in a provided circumferential groove 80. When the top and bottom sections 85 & 90 of the housing are assembled, the washer resides in the aforementioned gap for between the top and bottom tubular bosses 44. Additionally, the rubber washer, which slides against the circumferential groove of the cylindrical piece, creates a moderate amount of friction providing a suitable amount resistance to rotation of the cylindrical piece so that the housing does not rotate freely during use and the beam of light remains directed as desired by the user. As best shown in FIG. 5, the rubber washer further acts to hold the motherboard in place between a top surface of the washer and bottom surface of the top side 30 of the top section 85.

Referring primarily to FIG. 4, the process of assembling the first preferred embodiment is described herein. First, during the injection molding process threaded metal inserts are placed into the mold at the location of the top section bosses 100. In other variations, no inserts are utilized and the screws 45 are fastened directly to the plastic bosses. Various parts, such as the top and bottom sections 85 & 90 of the housing 15 and the cylindrical piece 55, are injection molded out of plastic or fabricated using other suitable means. As desired, logos and/or other indicia are pad printed onto the housing and cylindrical piece. Next, a preassembled motherboard 110 is placed against the top section of the housing. The window 35 is also placed in the top section. The cylindrical piece is then placed through the opening on the top side 30 of the top section, the corresponding tubular boss 44 and an opening provided in the motherboard. The rubber washer 105 is slid over the bottom end of the cylindrical piece and snapped into the provided groove thereby effectively holding both the cylindrical piece and the motherboard in place. Finally, the bottom section is moved into place and fastened to the top section with screws.

A Second Preferred Embodiment

Figure 7:
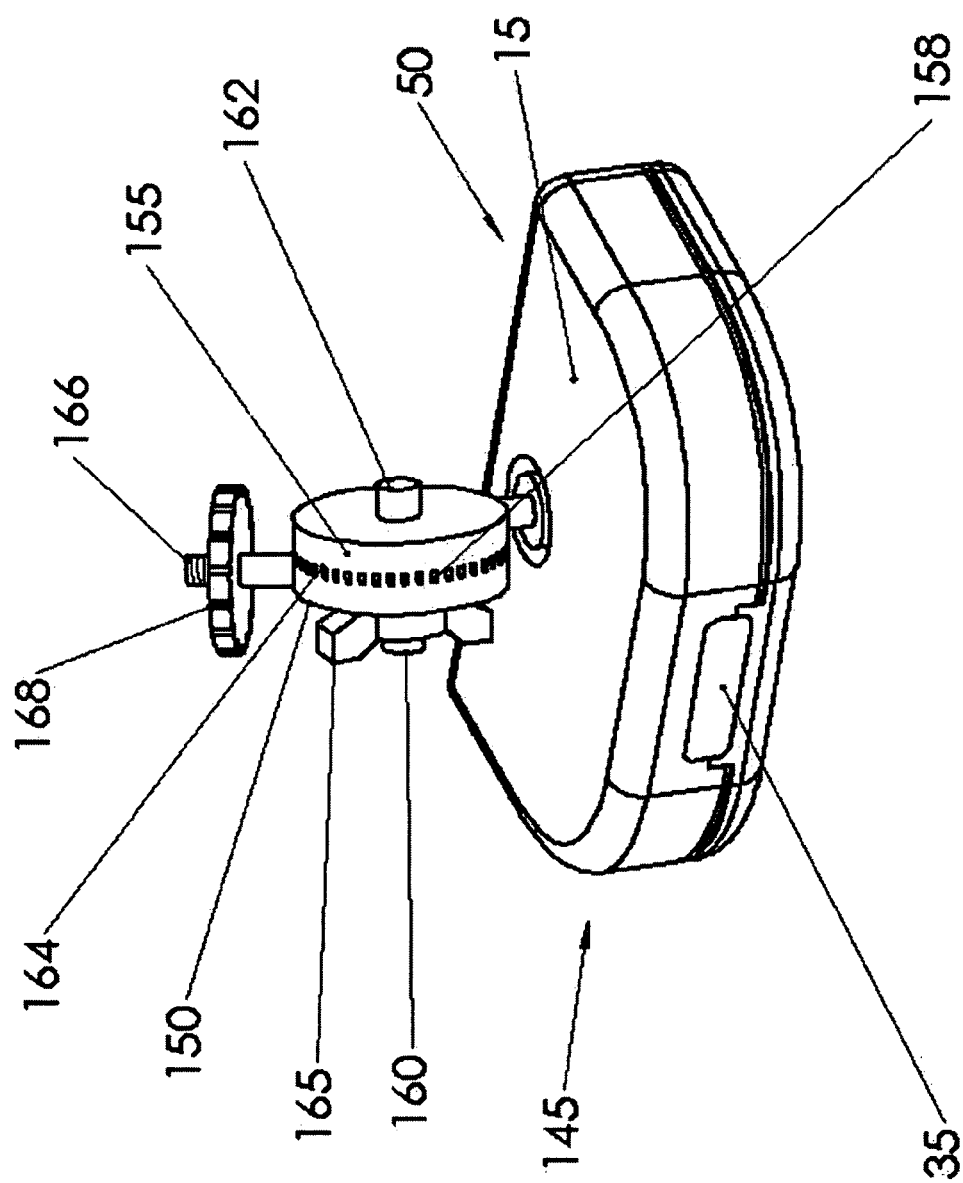
FIG. 7 is an isometric front view of a second embodiment of the present invention.

A second preferred embodiment 145 of the present invention is illustrated in FIG. 7. In general the housing 15, and the motherboard and its associated components are in most respects substantially similar to the first preferred embodiment. However, the means by which the apparatus connects to a camera differs significantly.

The second preferred embodiment does not have a cylindrical piece. Rather, a protrusion 155 that is typically integrally molded with the top section of the housing extends upwardly from the top section of the housing. The protrusion includes a circular mounting face 158 that is generally vertically-extending and perpendicular to the length of the apparatus's window. A fastener bore 162 extends through the protrusion perpendicular to the mounting face and through the center point of the mounting face. Serrations typically extend radially from the fastener hole on the mounting face.

The second preferred embodiment also includes a separately fabricated camera mounting piece 155 that includes a mounting face 164 that corresponds and is adapted to matingly couple with the mounting face of the top section's protrusion. Similarly, the mounting pieces mounting face include radial serrations that extend from a fastener bore that passes through the center of the mounting face. The mounting piece also includes a threaded stud 166 that extends upwardly from the portion of the mounting piece comprising the mounting face. The stud typically has ¼-20 sized threads for threadable receipt into the tripod mount of a camera. A separate thumbwheel 168 can also be provided that threads onto the stud and is adapted to be tightened against the bottom of a camera once the threaded stud has been secured into the tripod mount. Preferably, the mounting piece and the thumbwheel are injection molded of a glass fiber filled plastic, although other suitable materials can be used.

As illustrated, the two mounting surfaces mate against each other and are secured with a threaded fastener 160 and a corresponding wing nut 165. As is evident, by rotating the mounting piece 150 relative to the protrusion 155 the relative upwardly and downwardly pointing angle of the apparatus's window can be varied. Once a desired angle is set, the user can tighten the wing nut to lock the mounting faces 158 & 164 together. Accordingly, the second preferred embodiment provides the user with two degrees of freedom in adjusting the direction of the beam of light emanating from the apparatus's window relative to a camera lens: the first degree of freedom being rotation in a horizontal plane by moving the rotating the threaded stud relative to the camera's tripod mount; and the second degree of freedom being the rotation of the mounting piece relative to the corresponding protrusion in a generally vertical plane. This is in contrast to the first preferred embodiment that permits rotational adjustment only in a horizontal plane through the rotation of the cylindrical piece relative to the housing.

A Third Preferred Embodiment

Figure 8:
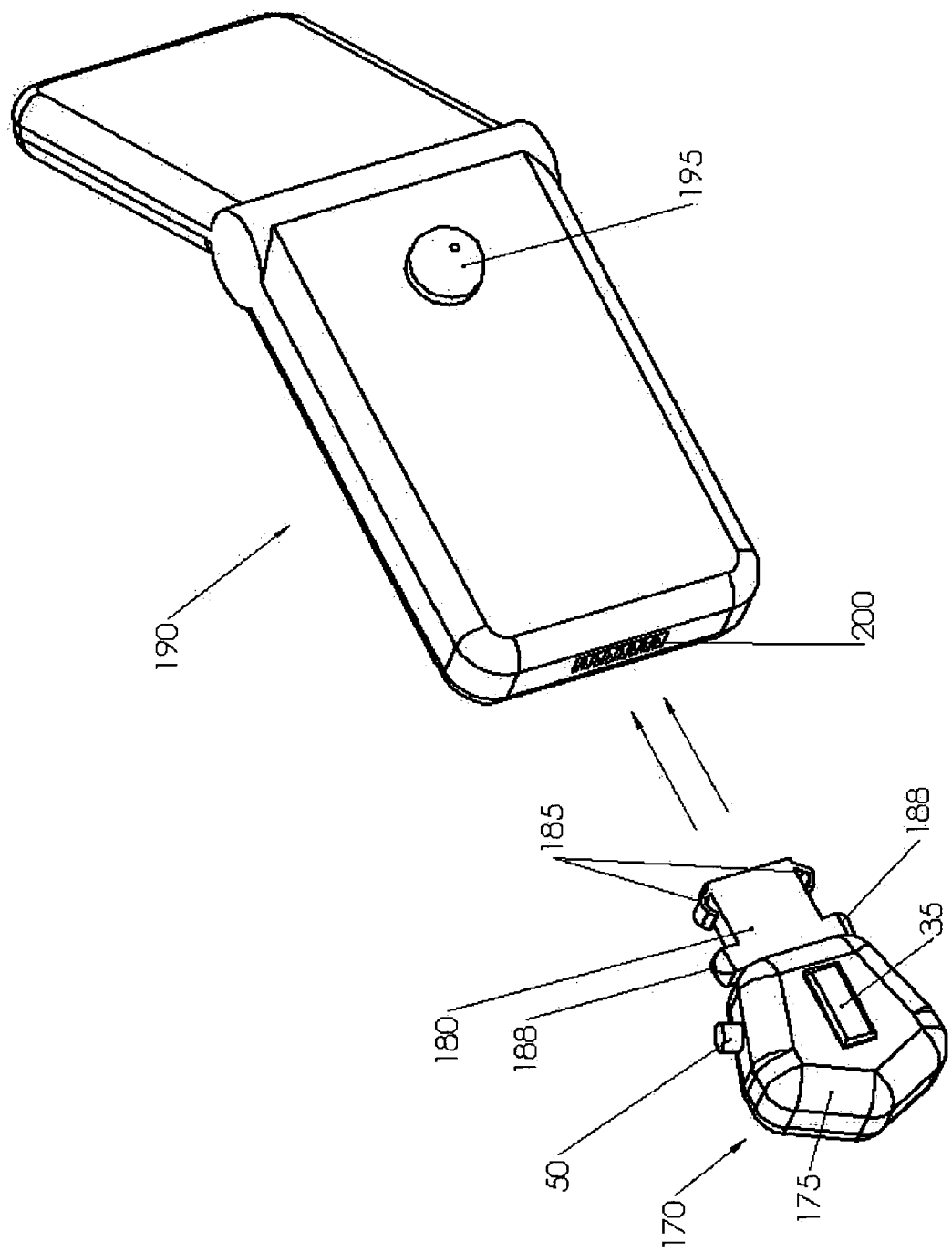
FIG. 8 is an isometric view of a third preferred embodiment of the present invention illustrating the connection of the embodiment with a camera-equipped wireless phone.

A third preferred embodiment 170 of the present invention is illustrated in FIG. 8. In general, the motherboard and its associated electronics of the third preferred embodiment are substantially similar to those of the first preferred embodiment as is the operation of the third preferred embodiment relative to the first. The third preferred embodiment differs from the first and second preferred embodiments primarily in that it is configured to mount to a wireless phone 190 that includes digital camera and associated camera lens 195 therein. These camera phones do not typically include tripod mounts. Accordingly, in place of a threaded stud, a connector 180 is provided to attach the apparatus to an associated phone.

Figure 9:
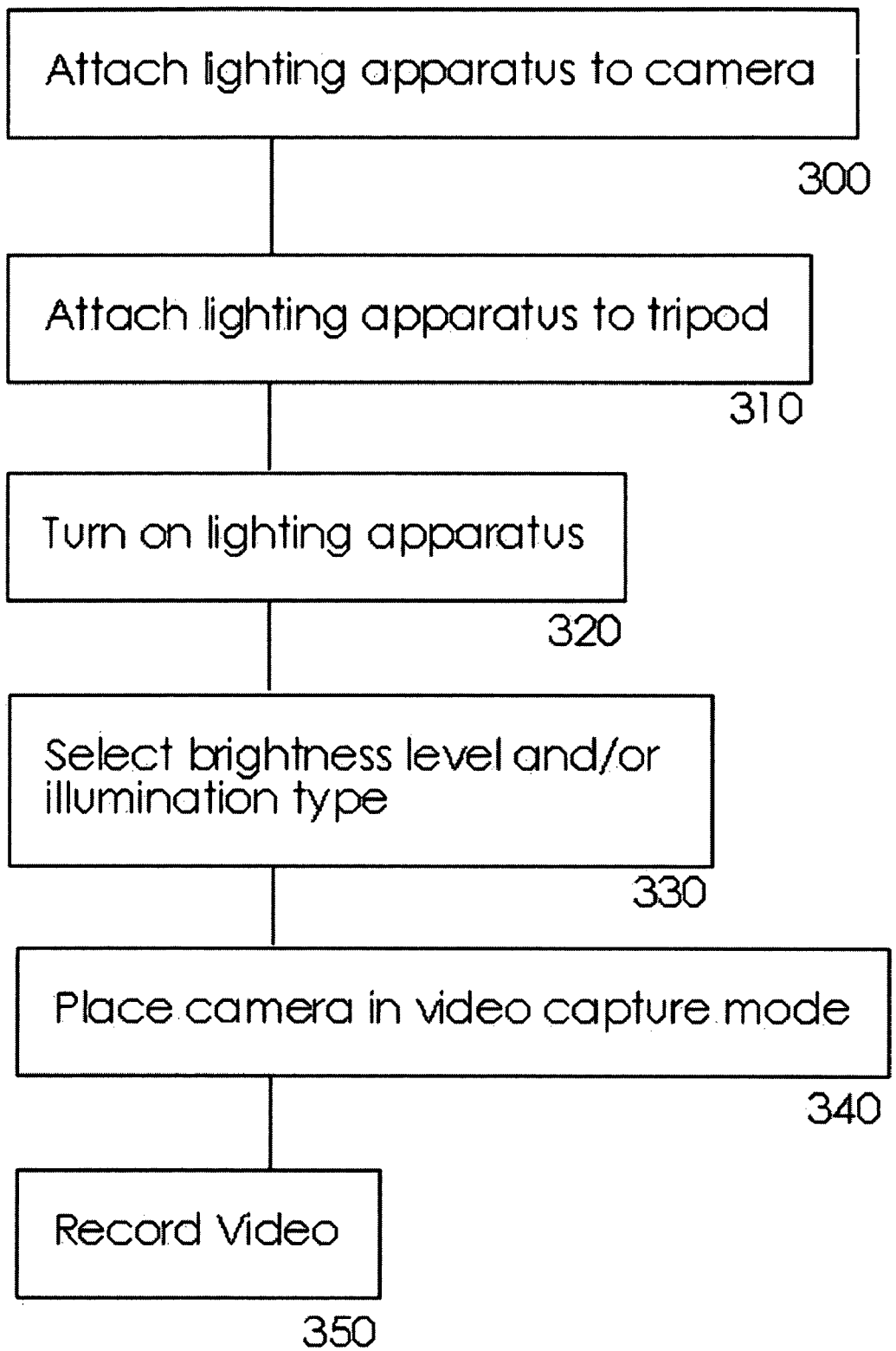
FIG. 9 is a flow chart illustrating a method of using a preferred embodiment of the present invention.

In general, there are no standard mounting locations on wireless phones and the various ports and connection locations vary substantially from phone to phone and manufacturer to manufacturer. Accordingly, the connector provided in variations of the third preferred embodiment will vary substantially depending on the phone to which the particular variation is adapted to connect. For instance, variations of the third preferred embodiment are contemplated wherein: (i) the apparatus connects to the phone at the phone's data and power port 200 (typically at a bottom end of the phone) as illustrated in FIG. 9; (ii) the apparatus includes a connector that snaps around or to a portion of the phone's body; and (iii) the apparatus includes a dummy jack adapter that connects to one of the phone's headset or external antenna jack. In certain variations of the third preferred embodiment the housing 175 can be configured to permit different types of connectors to be attached to it such that the housing and the componentry contained therein are standardized and a particular connector can be fitted to the housing to accommodate a particular brand and style of wireless phone.

The illustrated embodiment is adapted to connect to a phone at its power and data port 200 through a dummy connector 180 that does not electronically connect to the phone. In other words, the only purpose of the connector is to join the apparatus to the phone. A typical standard connector comprises a slot (not shown) that fits over an electrical and data interface board in the phone's port and a pair of outwardly biased prongs 185 that grip corresponding indentations in the phone's port to hold the connector in place. To attach the apparatus to the phone, a user: (i) pushes in two opposing buttons 188 that retract the biased prongs; (ii) slides the connector into the phone's port; and (iii) releases the buttons to engage the prongs.

The data and power ports 200 of most wireless phones permit only the one way transmission of current (except for the extremely low current levels associated with two way data transfer) into the phone to charge the phone's battery. Accordingly, in most instances the phones battery cannot be used to power the LEDs of the apparatus in place of batteries on the apparatus itself. However for those phones that permit two-way current flow at the port, variations of the third preferred embodiment are contemplated that utilize the camera's battery in place of its own power supply wherein power is transferred across a non-dummy version of the connector. Additionally, in another variation of the third preferred embodiment, the LEDs could be configured to strobe like a traditional flash when the camera's shutter button is pressed. In this variation, the flash trigger signal would be sent to the apparatus via the data and power port connection. In yet another variation, and on and off signal can be sent to the apparatus via the port to correspond with the beginning and end of the recording of a video clip.

A Method of using a Preferred Embodiment of the Present Invention

FIG. 9 is a flow chart illustrating the use of a preferred embodiment of the present invention in conjunction with a camera. First as indicated by block 300, a user attaches the lighting apparatus to the camera or camera phone. Concerning the first and second preferred embodiments, a threaded stud of the apparatus is threaded into the corresponding tripod mount on the associated camera. In one alternative embodiment described below, a threadless stud made at least partially of a resilient material is placed in the female tripod mount receptacle on the camera and then the resilient material is expanded outwardly to frictionally fix the stud and the associated apparatus in place. Concerning the third preferred embodiment and the many variations thereof, the apparatus is attached to a wireless camera phone using the appropriate connector provided for the particular style and brand of phone.

Next as indicated by block 310, if desired and the lighting apparatus is so equipped, the user can attach the lighting apparatus to a tripod or monopod by screwing the tripods threaded stud in the tripod mount provided on the bottom side of the apparatus. Concerning the second and third preferred embodiments that does not utilize a cylindrical piece; the threaded tripod mount can be provided on or in the bottom side of the apparatus housing.

The user then turns on the apparatus and selects the desired brightness level and illumination type (i.e. white light or infrared light) to put used given the particular lighting conditions relating to a scene and the desired effect as indicated in block 330.

If the user has not done so, he/she places the camera in the proper mode such as a video mode or a still picture mode as indicated in block 340. Finally, as shown in block 350, the user records video and/or takes a still picture.

It is appreciated that the order in which of the aforementioned operations is performed can vary from the order discussed above and illustrated in FIG. 9 as appropriate. For instance, a user can attach the lighting apparatus to a tripod prior to attaching the unit to a camera. Additionally, the user can place the place the camera in the appropriate mode at any point prior to recording the video or still picture. When using the described method to record video it is generally necessary to turn on the apparatus to illuminate the scene prior to recording video. However, in certain circumstances when using the camera to take still pictures, the user may turn off the apparatus prior to snapping the picture. For instance, the user may turn on the lighting apparatus to use the illumination to properly frame a scene, but then turn the apparatus off prior to snapping the picture relying on the camera's flash to properly illuminate the scene at that point.

Alternative Embodiments and Other Variations

The embodiments of the lighting apparatus and method of use thereof as illustrated in the accompanying figures and described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

In certain alternative embodiments, the tripod threaded stud can be fixedly and directly attached to the housing or the stud can be integrally molded with the housing. Variations of mounting devices are contemplated other than illustrated concerning the preferred embodiments. For instance, a ball and socket joint can be provided between the threaded stud and the housing wherein multiple degrees of adjustment freedom are provided.

Figure 10:
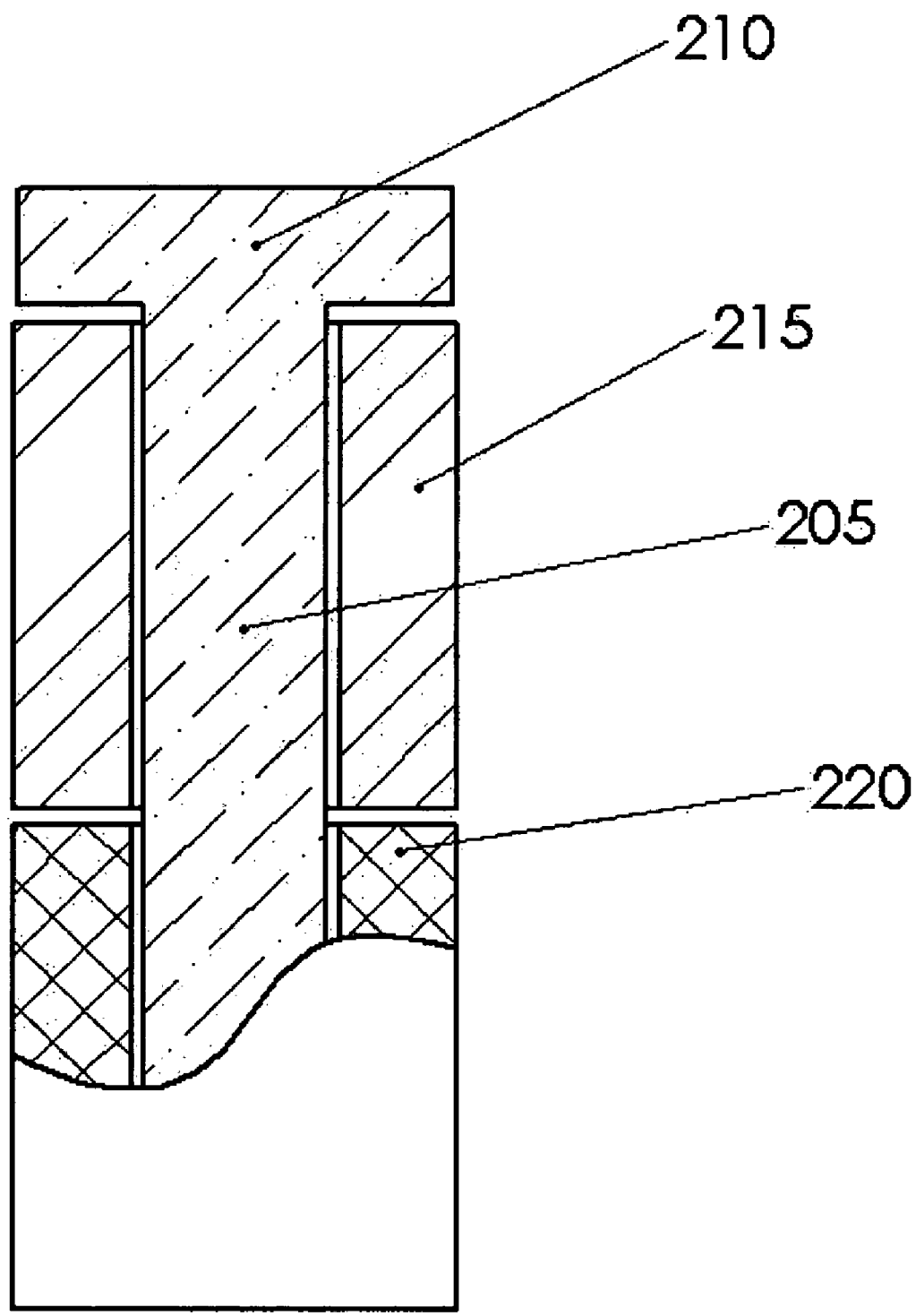
FIG. 10 is a cross sectional view of a non-threaded stud as can be used in variations of the preferred embodiments.

In other alternative embodiments, a non-threaded stud can be used in place of a threaded stud, such as the stud illustrated in FIG. 10. This threadless stud typically comprises a solid core 205 comprising metal or a plastic material. The top end 210 of the core is flanged to retain a cylindrical elastomeric element 215 thereon. In general, the diameter of the elastomeric element is close to the inside diameter of a standard tripod mount on a camera. Beneath the elastomeric cylinder is a rigid cylinder 220 generally of a similar diameter as the elastomeric cylinder. It is coupled to a mechanism (not shown) similar to that found in a ball point pen that moves the cylinder between a first retracted position to a second actuated locked position. By pushing a button (not shown), the rigid cylinder can be moved from one position to the other. When in the actuated position the rigid cylinder compresses the elastomeric element causing it to bulge outwardly and frictionally secure the threadless stud and the apparatus connected thereto in the camera tripod mount. By moving the rigid cylinder into the retracted position, the elastomeric element relaxes and returns to its nominal diameter and the stud can be removed from the camera's tripod mount.

In other alternative embodiments, different LEDs and combinations thereof can be used. For instance, a lighting apparatus can be produced that has several differently colored LEDs that can be illuminated. The user can choose the particular color LEDs he/she desires to use depending on a particular effect he/she desires in the resulting still picture or video. Further, the controller can be configured to flash or strobe the LEDs in certain modes to enhance the creativity of a user's pictures and/or videos.

In yet other alternative embodiments, a lighting apparatus can be configured to attach to a PDA that incorporates a digital camera. In a manner similar to the illustrated version of the third preferred embodiment, PDA-specific alternative embodiments can be attached to the PDA at its data and power port. In other variations, the lighting apparatus can be attached to the PDA by way of an accessory card port or through a specially configured bracket that couples to the body of the PDA.

In certain alternative embodiments, the electronic componentry of the device may include a photosensitive sensor to determine the relative amount of ambient light in a particular area and based on the signal from the sensor a controller circuit can adjust the light output of the apparatus to an optimum level.

I claim:

1. A lighting apparatus for use with a camera, the lighting apparatus comprising:
   one or more light emitting diodes (LEDs);
   one or more button cell batteries electrically coupled to the one or more LEDs;
   a housing at least partially encasing the one or more LEDs, the housing having a first surface; and
   a threaded stud extending from the first surface, the stud being (i) adapted to be removably received in a threaded bore of a digital still camera tripod mount and (ii) operatively rotateably coupled with the housing;
   wherein the housing further includes (a) a second surface, the second surface being generally opposite the first surface, and (b) a threaded cylindrical bore extending inwardly into the housing relative to the second surface, the threaded cylindrical bore being adapted to removably receive a standard-sized threaded stud of tripod therein, and;
   the lighting apparatus has a total weight of less than 2.0 ounces.

2. The lighting apparatus of claim 1, further comprising a thumbwheel, the thumbwheel being positioned between the first surface and the stud.

3. The lighting apparatus of claim 1, wherein the stud has an axis and the stud is integral with a cylindrical piece that extends between the first and second surfaces, the cylindrical piece includes a first end opposite the stud, a threaded cylindrical bore extends inwardly from the first end, and the threaded cylindrical bore has an axis substantially aligned with the axis of the stud.

4. The lighting apparatus of claim 1, further comprising a switch electrically coupled to the one or more LEDs and the power source.

5. The lighting apparatus of claim 4, wherein the switch is adapted to switch the one or more LEDs to three or more settings including at least three of (i) off, (ii) a first brightness level, (iii) a second brightness level and (iv) infrared illumination.

6. The lighting apparatus of claim 1, further comprising a timer circuit, the timer circuit being adapted to interrupt the flow of electricity between the power source and the one or more LEDs after a predetermined period of time.

7. The lighting apparatus of claim 1, further comprising a circuit board, the circuit board electrically coupling the power source and the one or more LEDs, and wherein one or more LEDs are surface mounted to the circuit board.

8. A combination comprising a digital still camera and a lighting apparatus, wherein:
   the digital still camera includes a digital sensor and power source contained within a camera housing, a tripod mount and a lens, the digital still camera being adapted to capture both digital still images and videos; and
   the lighting apparatus comprises one or more light emitting diodes (LEDs), one or more button cell batteries electrically coupled to the one or more LEDs, a housing at least partially encasing the one or more LEDs, the housing having a first surface, and a threaded stud extending from the first surface, the stud being removably received in a threaded bore of the tripod mount;
   wherein the housing further includes a second surface, the second surface being generally opposite the first surface, and the lighting apparatus further includes a threaded cylindrical bore extending inwardly into the housing relative to the second surface, the threaded cylindrical bore being adapted to removably receive a standard-sized threaded stud of tripod therein.

9. A lighting apparatus for use with a camera, the lighting apparatus comprising:

one or more light emitting diodes (LEDs);

one or more batteries electrically coupled to the one or more LEDs;

a housing at least partially encasing the one or more LEDs, the housing having a first surface; and a threaded stud extending from the first surface, the stud being (i) adapted to be removably received in a threaded bore of a digital still camera tripod mount and (ii) operatively rotateably coupled with the housing;

wherein the housing further includes (a) a second surface, the second surface being generally opposite the first surface, and (b) a threaded cylindrical bore extending inwardly into the housing relative to the second surface, the threaded cylindrical bore being adapted to removably receive a standard-sized threaded stud of tripod therein.

* * * * *